(12) United States Patent
Weber et al.

(10) Patent No.: US 7,163,987 B2
(45) Date of Patent: Jan. 16, 2007

(54) THERMOPLASTIC MOLDING COMPOSITIONS WITH AN IMPROVED MELT STABILITY BASED ON POLYARLENE ETHER SULFONES

(75) Inventors: Martin Weber, Maikammer (DE); Joachim Queisser, Mannheim (DE)

(73) Assignee: BASF Aktiengesellschaft, Ludwigshfen (DE)

( * ) Notice: Subject to any disclaimer, the term of this patent is extended or adjusted under 35 U.S.C. 154(b) by 257 days.

(21) Appl. No.: 10/491,481

(22) PCT Filed: Sep. 27, 2002

(86) PCT No.: PCT/EP02/10868

§ 371 (c)(1),
(2), (4) Date: Apr. 1, 2004

(87) PCT Pub. No.: WO03/033565

PCT Pub. Date: Apr. 24, 2003

(65) Prior Publication Data

US 2004/0242807 A1 Dec. 2, 2004

(30) Foreign Application Priority Data

Oct. 10, 2001 (DE) ............................. 101 49 871

(51) Int. Cl.
 *C08L 81/06* (2006.01)
(52) U.S. Cl. ............... 525/535; 528/171; 528/175; 528/219; 528/373; 528/391
(58) Field of Classification Search .................... None
See application file for complete search history.

(56) References Cited

U.S. PATENT DOCUMENTS 3,960,815 A 6/1976 Darsow et al.
4,152,367 A * 5/1979 Binsack et al. ............ 525/461
4,746,710 A 5/1988 Dickinson et al.
5,270,435 A 12/1993 Pfaendner et al.

FOREIGN PATENT DOCUMENTS

DE   1 595 710   4/1970
EP    185 237    6/1986

OTHER PUBLICATIONS

Gaechter et al., *Kunststoff-Additive*, Hanser-Verlag Muenchen, 3. Ausgabe (1989), S. 443 ff.
Kiss, *Polymer Engineering and Science*, vol. 27 (Mar. 1987), 410.
Engberg et al., *Polymer Engineering and Science*, vol. 27 (1994), 1336.

* cited by examiner

*Primary Examiner*—Marc S. Zimmer
(74) *Attorney, Agent, or Firm*—Novak Druce & Quigg, LLP

(57) ABSTRACT

The present invention relates to molding compositions comprising
 A) from 39 to 99% by weight of at least one polyarylene ether sulfone built up from bifunctional monomer units,
 B) from 1 to 20% by weight of at least one polyarylene ether sulfone containing, based on the total weight of component B, from 0.1 to 10% by weight of units which derive from 1,1,1-tris(4-hydroxyphenyl)ethane,
 C) from 0 to 60% by weight of at least one filler,
 D) from 0 to 40% by weight of at least one impact-modifying rubber, and
 E) from 0 to 40% by weight of one or more various additives,
where the percentages by weight of components A to E give 100% in total,
and also to a process for preparing these molding compositions, to their use, and to moldings, films, fibers, or foams obtainable from these molding compositions.

11 Claims, No Drawings

THERMOPLASTIC MOLDING COMPOSITIONS WITH AN IMPROVED MELT STABILITY BASED ON POLYARYLENE ETHER SULFONES

The present invention relates to molding compositions comprising

A) from 39 to 99% by weight of at least one polyarylene ether sulfone built up from bifunctional monomer units,
B) from 1 to 20% by weight of at least one polyarylene ether sulfone containing, based on the total weight of component B, from 0.1 to 10% by weight of units which derive from 1,1,1-tris(4-hydroxyphenyl)ethane,
C) from 0 to 60% by weight of at least one filler,
D) from 0 to 40% by weight of at least one impact-modifying rubber, and
E) from 0 to 40% by weight of one or more various additives, where the percentages by weight of components A to E give 100% in total.

The present invention further relates to a process for preparing these compositions, to the use of these compositions in producing moldings, films, fibers, or foams, and to moldings, films, fibers, or foams made from the molding compositions of the invention.

Molding compositions based on polyarylene ether sulfones are well known. Their high heat resistance and chemicals resistance give them broad scope for use in applications where the materials used are subject to severe thermal or chemical stress. Relatively high processing temperatures are needed for thermoplastic processing of polyarylene ether sulfones, since their glass transition temperatures and softening points are higher than those of other thermoplastics, and their melt viscosity is relatively high. These high processing temperatures often cause undesirable side reactions in the polyarylene ether sulfone melt, for example molecular weight degradation or crosslinking.

To lower the high melt viscosity of polyarylene ether sulfones and improve flowability, it is known that lubricants can be used, for example stearates or oligomeric fatty esters (see, for example, R. Gächter, H. Müller, Kunststoff-Additive, Hanser-Verlag Munich, 3rd Edition, 1989, pp. 443 et seq.), as can liquid-crystalline polymers (see, for example, G. Kiss, Polym. Eng. & Sci. 27 (1987) 410 or K. Engberg et al., Polym. Eng. & Sci. 34 (1994) 1336). However, these additives cannot provide sufficient prevention of undesired side-reactions in the polyarylene ether sulfone melt, as evidenced by melt discoloration, for example.

U.S. Pat. No. 3,960,815 discloses branched polyarylene ether sulfones obtained via the presence of aromatic compounds having at least three functional hydroxy or halide groups in the polyarylene ether sulfone synthesis from aromatic bishydroxylates and aromatic bishalogen compounds. These branched polyarylene ether sulfones have improved resistance when set against unsaturated polyester resins, reduced flammability, and reduced tendency toward stress-cracking corrosion. However, the melt stability of these branched polyarylene ether sulfones is unsatisfactory.

It is an object of the present invention to provide thermoplastic molding compositions which are based on polyarylene ether sulfones and have improved melt stability, i.e. less tendency toward undesired side-reactions in the melt, for example molecular weight degradation, crosslinking, or discoloration.

We have found that this object is achieved by means of the molding compositions defined at the outset and described in more detail below.

Component A

The molding compositions of the invention comprise, based on the total weight of A to E, from 39 to 99% by weight, in particular from 49 to 99% by weight, and particularly preferably from 58 to 98% by weight, of component A.

According to the invention, the component A used comprises a polyarylene ether sulfone built up from bifunctional monomer units. The component A used may also comprise a mixture made from two or more different polyarylene ether sulfones built up from bifunctional monomer units.

The arylene groups of the polyarylene ether sulfones A may be identical or different and, independently of one another, are an aromatic radical having from 6 to 18 carbon atoms. Examples of suitable arylene radicals are phenylene, biphenylene, terphenylene, 1,5-naphthylene, 1,6-naphthylene, 1,5-anthrylene, 9,10-anthrylene and 2,6-anthrylene. Among these, preference is given to 1,4-phenylene and 4,4'-biphenylene. These aromatic radicals are preferably unsubstituted. However, they may have one or more substituents. Examples of suitable substituents are alkyl, arylalkyl, aryl, nitro, cyano and alkoxy groups, and also heteroaromatics, such as pyridine, and halogen. Preferred substituents include alkyl having up to 10 carbon atoms, such as methyl, ethyl, isopropyl, n-hexyl and isohexyl, $C_1$-$C_{10}$-alkoxy, such as methoxy, ethoxy, n-propoxy and n-butoxy, aryl having up to 20 carbon atoms, such as phenyl or naphthyl, and also fluorine and chlorine.

Other preferred substituents are those obtainable by reacting the polyarylene ether sulfones with a reactive compound which has, besides a carbon-carbon double or triple bond, one or more carbonyl, carboxylic acid, carboxylate, anhydride, amide, imide, carboxylic ester, amino, hydroxyl, epoxy, oxazoline, urethane, urea, lactam or halobenzyl groups. The bonding of the arylene groups to one another in the polyarylene ethers may be via —$SO_2$—, and, for example, via —O—, —S—, —SO—, —CO—, —N=N—, —COO—, or via an unsubstituted or substituted alkylene radical, or via a chemical bond.

Preferred polyarylene ether sulfones which can be used according to the invention (component A) have a structure made from repeat units of the formula I

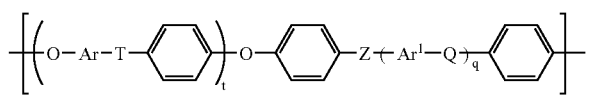

(I)

where
t and q, independently of one another, are 0, 1, 2 or 3,
each of Q, T and Z, independently of one another, is a chemical bond or a group selected from the class consisting of —O—, —S—, —$SO_2$—, S=O, C=O, —N=N—, —$R^a$C=$CR^b$— and —$CR^cR^d$—, where
each of $R^a$ and $R^b$, independently of one another, is hydrogen or $C_1$–$C_{12}$-alkyl and
each of $R^c$ and $R^d$, independently of one another, is hydrogen or $C_1$–$C_{12}$-alkyl, $C_1$–$C_{12}$-alkoxy or $C_6$–$C_{18}$-aryl, and, where appropriate, $R^c$ and $R^d$, if they are alkyl, alkoxy or aryl, may independently of one another have fluorine and/or chlorine substituents or, together with the carbon atom to which they are bonded, may form a $C_3$–$C_{12}$-cycloalkyl group, which may be unsubstituted or substituted by one or more $C_1$–$C_6$-alkyl groups, with the proviso that at least one of the groups T, Q and Z is —$SO_2$— and, if t and q are 0, Z is —$SO_2$—, and each of Ar and $Ar^1$, independently of one another, is $C_6$–$C_{18}$-arylene, unsubstituted or substituted by $C_1$–$C_{12}$-alkyl, $C_6$–$C_{18}$-aryl, $C_1$–$C_{12}$-alkoxy or halogen.

It is also possible for different units of the formula I to be present in the polyarylene ether sulfone, distributed randomly or in blocks.

One way of preparing polyarylene ethers A which may be used according to the invention is based on GB 1 152 035 and U.S. Pat. No. 4,870,153, expressly incorporated herein by way of reference. Examples of suitable process conditions for the synthesis of polyarylene ether sulfones are described in EP-A-0 113 112 and EP-A-0 135 130. A particularly suitable method is reaction of the monomers in aprotic polar solvents in the presence of anhydrous alkali metal carbonate. A particularly preferred combination is N-methylpyrrolidone as solvent and potassium carbonate as catalyst. The reaction in the melt is likewise preferred. Examples of suitable polyarylene ether sulfones A are those having at least one of the following structural repeat units $I_1$ to $I_{15}$:

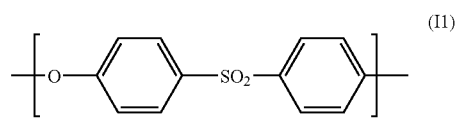

(I1)

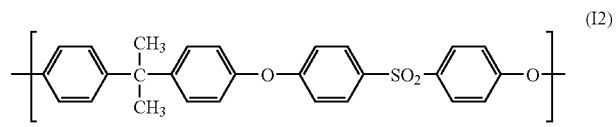

(I2)

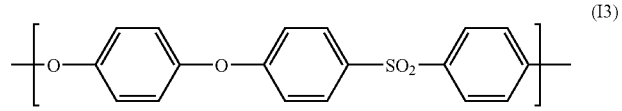

(I3)

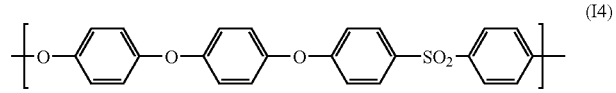

(I4)

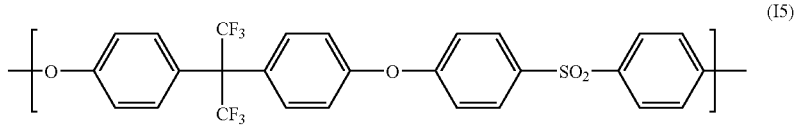

(I5)

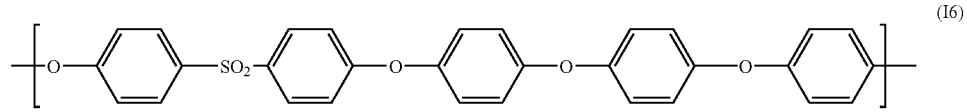

(I6)

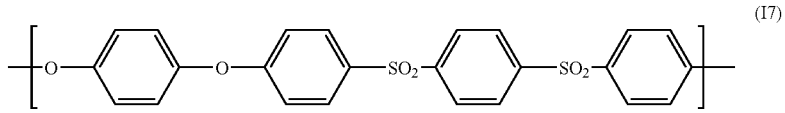

(I7)

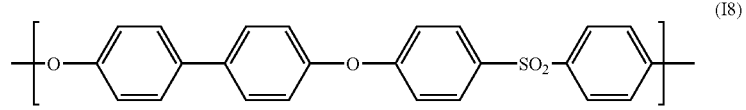

(I8)

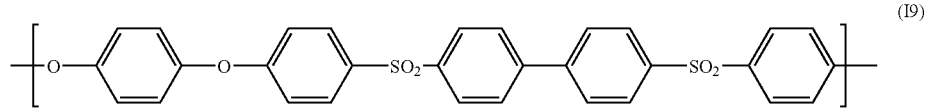

(I9)

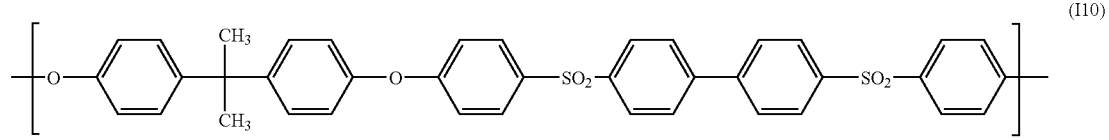

(I10)

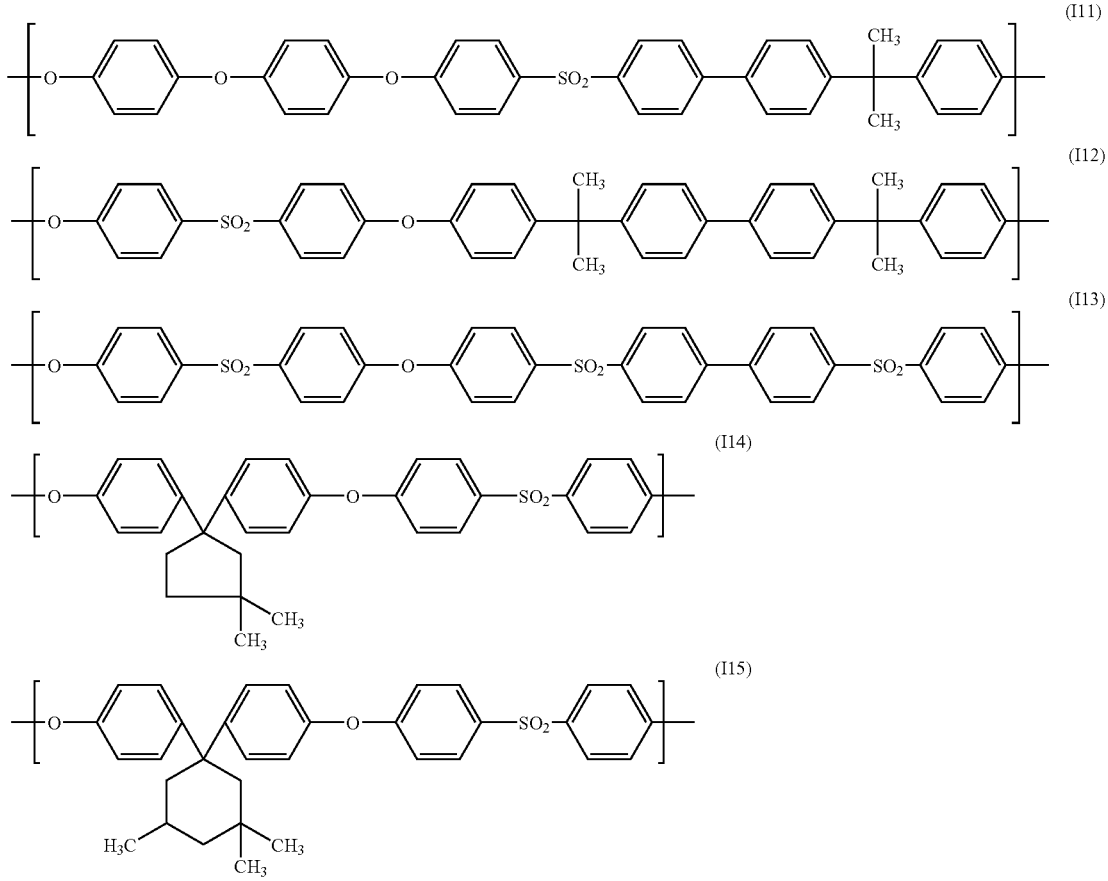

Particularly preferred units which may be mentioned of the formula I are I1 and I2, which may be present individually or in a mixture.

Depending on the synthesis conditions, the polyarylene ether sulfones may have various functional groups. These functional groups may have been bonded to atoms of the polymer chain or be polymer chain end groups. These functional groups include halogen, in particular chloro, alkoxy, especially methoxy or ethoxy, aryloxy, preferably phenoxy or benzyloxy. Other examples which may be mentioned of functional groups of this type are hydroxy, amino, anhydride, epoxy, and carboxy groups. Among these, particular preference is given to polyarylene ether sulfones having amino, anhydride, or epoxy end groups, and mixtures of these.

The preparation of polyarylene ether sulfones A containing functional groups has been described in DE-A1 199 61 040 and in the references mentioned therein.

The polyarylene ether sulfones A may also be copolymers or block copolymers, in which there are polyarylene ether sulfone segments and segments of other thermoplastic polymers, such as polyesters, aromatic polycarbonates, polyester carbonates, polysiloxanes, polyimides, or polyetherimides. The molar masses (number-average) of the blocks or graft branches in the copolymers is generally in the range from 1000 to 30 000 g/mol. The blocks with different structures may alternate or have random distribution. The proportion by weight of the polyarylene ether sulfones in the copolymers or block copolymers is generally at least 10%. The proportion by weight of the polyarylene ether sulfones can be up to 97%. Preference is given to copolymers or block copolymers whose proportion by weight of polyarylene ether sulfones is up to 90%. Particular preference is given to copolymers or block copolymers having from 20 to 80% by weight of polyarylene ether sulfones.

The polyarylene ether sulfones generally have average molar masses $M_n$ (number-average) in the range from 2 500 to 60 000 g/mol, and relative viscosities of from 0.15 to 0.95 dl/g. Depending on the solubility of the polyarylene ether sulfones, the relative viscosities are measured either in 1% strength by weight N-methylpyrrolidone solution or in a mixture of phenol and dichlorobenzene, in each case at 20 or 25° C.

Component B

Component B is present in the molding compositions of the invention in amounts of from 1 to 20% by weight, in particular from 1 to 18% by weight, particularly preferably from 2 to 15% by eight, based on the total weight of A to E.

The component B used in the molding compositions of the invention comprises branched polyarylene ether sulfones. Polyarylene ether sulfones B have been built up from the structural units described above under component A, but component B also contains in each case based on the total weight of component B, from 0.1 to 10% by weight, preferably from 0.5 to 7.5% by weight, particularly preferably from 1.0 to 6.0% by weight, very particularly preferably from 1.5 to 2.5% by weight, of units which derive from 1,1,1-tris(4-hydroxyphenyl)ethane.

Preferred polyarylene ether sulfones B contain
from 0 to 100 mol % of repeat units of the formula I1, and
from 0 to 100 mol % of repeat units from the formula I2,
where the molar percentages of repeat units of the formulae I1 and I2 give 100 mol % in total, and from 0.1 to 10% by weight, preferably from 0.5 to 7.5% by weight, particularly preferably from 1.0 to 6.0% by weight, very particularly preferably from 1.5 to 2.5% by weight, in each case based on the total weight of the polyarylene ether sulfones B, of units which derive from 1,1,1-tris(4-hydroxyphenyl)ethane.

Polyarylene ether sulfones B are prepared by the methods described above under the preparation of component A, but an appropriate portion of the bifunctional monomer components, preferably of the bifunctional hydroxy component, is replaced by the desired amount of 1,1,1-tris(4-hydroxyphenyl)ethane. Synthesis methods for component B have also been described in U.S. Pat. No. 3,960,815.

Component C

The molding compositions of the invention may, if desired, comprise from 0 to 60% by weight of reinforcing agents or fillers. The molding compositions of the invention preferably comprise from 0 to 50% by weight, in particular from 0 to 45% by weight, of fibrous or particulate fillers or reinforcing materials, or mixtures of these. Each of the amounts given is based on the total weight of components A to E.

Preferred fibrous fillers or fibrous reinforcing materials are carbon fibers, potassium titanate whiskers, aramid fibers and particularly preferably glass fibers. If glass fibers are used they may have been provided with a size, preferably a polyurethane size, and with a coupling agent, to improve compatibility with the matrix material. The carbon fibers and glass fibers used generally have a diameter of from 6 to 20 μm.

The glass fibers may be incorporated either as short glass fibers or else as continuous-filament strands (rovings). The average length of the glass fibers in the finished injection molding is preferably from 0.08 to 0.5 mm.

Carbon fibers or glass fibers may also be used as wovens, mats or glass silk rovings.

Suitable particulate fillers are amorphous silica, carbonates, such as magnesium carbonate or chalk, powdered quartz, mica, a very wide variety of silicates, such as clays, muscovite, biotite, suzoite, tin maletite, talc, chlorite, phlogophite, feldspar, calcium silicates, such as wollastonite, or aluminum silicates, such as kaolin, particularly calcined kaolin.

In a particularly preferred embodiment use is made of particulate fillers in which at least 95% by weight, preferably at least 98% by weight, of the particles have a diameter (maximum dimension) determined on the finished product of less than 45 μm, preferably less than 40 μm, and of which the aspect ratio, determined on the finished product, is from 1 to 25, preferably from 2 to 20.

The particle diameters here may, for example, be determined by taking electron micrographs of thin sections of the polymer mixture and using at least 25, preferably at least 50, filler particles for the evaluation. The particle diameters may also be determined by sedimentation analysis as in Transactions of ASAE, page 491 (1983). The proportion by weight of fillers of size below 40 μm may also be measured by screen analysis. The aspect ratio is the ratio of particle diameter to thickness (largest to smallest dimension).

Particularly preferred particulate fillers are talc, kaolin, such as calcined kaolin, and wollastonite and mixtures of two or all of these fillers. Among these, particular preference is given to talc with a proportion of at least 95% by weight of particles of diameter less than 40 μm and with an aspect-ratio of from 1.5 to 25, determined in each case on the finished product. Kaolin preferably has a proportion of at least 95% by weight of particles of diameter less than 20 μm and an aspect ratio of from 1.2 to 20, determined in each case on the finished product.

Component D

If desired, the molding compositions of the invention may comprise impact-modifying rubbers D. Their proportion, based on the total weight of A to E, is from 0 to 40% by weight, in particular from 0 to 25% by weight, particularly preferably from 0 to 20% by weight.

Component D may also be a mixture of two or more different impact-modifying rubbers.

For the purposes of the present invention, rubbers are generally polymers with elastomeric properties at room temperature.

Preferred rubbers which increase the toughness of the molding compositions generally have two significant features: they comprise an elastomeric fraction whose glass transition temperature is below −10° C., preferably below −30° C., and they contain at least one functional group which can interact with the polyarylene ether sulfone A or B. Examples of suitable functional groups are carboxylic acid groups, carboxylic anhydride groups, carboxylic ester groups, carboxamide groups, carboximide groups, amino groups, hydroxyl groups, epoxy groups, urethane groups and oxazoline groups.

Preferred functionalized rubbers D include functionalized polyolefin rubbers built up from the following components:

$d_1$) from 40 to 99% by weight of at least one α-olefin having from 2 to 8 carbon atoms;

$d_2$) from 0 to 50% by weight of a diene;

$d_3$) from 0 to 45% by weight of a $C_1$–$C_{12}$-alkyl ester of acrylic or methacrylic acid, or a mixture of esters of this type;

$d_4$) from 0 to 40% by weight of an ethylenically unsaturated $C_2$–$C_{20}$ mono- or dicarboxylic acid or of a functional derivative of an acid of this type;

$d_5$) from 1 to 40% by weight of a monomer containing epoxy groups; and $d_6$) from 0 to 5% by weight of other monomers capable of free-radical polymerization.

Examples of suitable α-olefins $d_1$ are ethylene, propylene, 1-butylene, 1-pentylene, 1-hexylene, 1-heptylene, 1-octylene, 2-methylpropylene, 3-methyl-1-butylene and 3-ethyl-1-butylene. Ethylene and propylene are preferred.

Examples of suitable diene monomers $d_2$ are conjugated dienes having from 4 to 8 carbon atoms, such as isoprene and butadiene, nonconjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo [$5.2.1.0^{2,6}$]-3,8-decadiene, or mixtures of these. Preference is given to 1,5-hexadiene, 5-ethylidenenorbornene and dicyclopentadiene. The diene content is generally from 0 to 50% by weight, preferably from 0.5 to 50% by weight, in particular from 2 to 20% by weight and particularly preferably from 3 to 15% by weight, based on the total weight of the olefin polymer.

Examples of suitable esters $d_3$ are methyl, ethyl, propyl, n-butyl, isobutyl, 2-ethylhexyl, octyl and decyl acrylates and the corresponding methacrylates. Among these particular preference is given to methyl, ethyl, propyl, n-butyl and 2-ethylhexyl acrylate and methacrylate.

Instead of the esters $d_3$, or in addition to these, the olefin polymers may also comprise acid-functional and/or latently acid-functional monomers in the form of ethylenically unsaturated mono- or dicarboxylic acids $d_4$.

Examples of monomers $d_4$ are acrylic acid, methacrylic acid, tertiary alkyl esters of these acids, in particular tert-butyl acrylate, and dicarboxylic acids, such as maleic acid and fumaric acid, and derivatives of these acids, and also their half-esters.

For the purposes of the invention, latently acid-functional monomers are those compounds which under the conditions of the polymerization or during incorporation of the olefin polymers into the molding compositions form free acid groups. Examples of these are anhydrides of dicarboxylic acids having from 2 to 20 carbon atoms, in particular maleic anhydride, and tertiary $C_1$–$C_{12}$-alkyl esters of the above-mentioned acids, in particular tert-butyl acrylate and tert-butyl methacrylate.

Ethylenically unsaturated dicarboxylic acids and anhydrides $d_4$ have the following formulae II and III:

   (II)

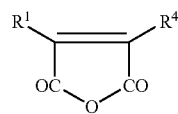   (III)

where $R^1$, $R^2$, $R^3$ and $R^4$, independently of one another, are hydrogen or $C_1$–$C_6$-alkyl.

Monomers $d_5$ bearing epoxy groups have the following formulae IV and V:

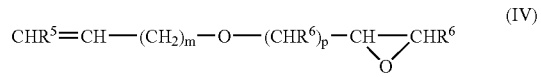   (IV)

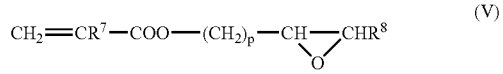   (V)

where $R^5$, $R^6$, $R^7$ and $R^8$, independently of one another, are hydrogen or $C_1$–$C_6$-alkyl, m is an integer from 0 to 20, and p is an integer from 0 to 10.

$R^1$ to $R^8$ are preferably hydrogen, m is preferably 0 or 1, and p is preferably 1.

Preferred compounds $d_4$ and, respectively, $d_5$ are maleic acid, fumaric acid and maleic anhydride and, respectively, alkenyl glycidyl ethers and vinyl glycidyl ether.

Particularly preferred compounds of the formulae II and III and, respectively, IV and V are maleic acid and maleic anhydride and, respectively, acrylates and/or methacrylates both of which contain epoxy groups, in particular glycidyl acrylate and glycidyl methacrylate.

Particular preference is given to olefin polymers made from
from 49.9 to 98.9% by weight, in particular from 59.85 to 94.85% by weight, of ethylene, and
from 1 to 50% by weight, in particular from 5 to 40% by weight, of an ester of acrylic or methacrylic acid, and
from 0.1 to 20.0% by weight, in particular from 0.15 to 15% by weight, of glycidyl acrylate and/or glycidyl methacrylate, acrylic acid and/or maleic anhydride.

Particularly suitable functionalized rubbers D are ethylene-methyl methacrylate-glycidyl methacrylate polymers, ethylene-methyl acrylate-glycidyl methacrylate polymers, ethylene-methyl acrylate-glycidyl acrylate polymers, and ethylene-methyl methacrylate-glycidyl acrylate polymers.

Examples of other monomers $d_6$ are vinyl esters and vinyl ethers and mixtures of these.

The polymers described above may be prepared by processes known per se, preferably by random copolymerization at high pressure and elevated temperature.

The melt index of the copolymers is generally from 1 to 80 g/10 min (measured at 190° C. and 2.16 kg load).

Core-shell graft rubbers are another group of suitable rubbers. These are graft rubbers prepared in emulsion and composed of at least one hard and one soft constituent. Usually, a hard constituent is a polymer with a glass transition temperature of at least 25° C., and a soft constituent is a polymer with a glass transition temperature of not more than 0° C. These products have a structure made from a core (graft base) and from at least one shell (graft), and the structure is a result of the sequence of addition of the monomers. The soft constituents generally derive from butadiene, isoprene, alkyl acrylates, alkyl methacrylates or siloxanes and, if desired, other comonomers. Suitable siloxane cores may be prepared, for example, starting from cyclic oligomeric octamethyltetrasiloxane or from tetravinyltetramethyltetrasiloxane. These may, for example, be reacted with γ-mercaptopropylmethyldimethoxysilane in a ring-opening cationic polymerization, preferably in the presence of sulfonic acids, to give the soft siloxane cores. The siloxanes may also be crosslinked by, for example, carrying out the polymerization in the presence of silanes having hydrolyzable groups, such as halogen or alkoxy, for example tetraethoxysilane, methyltrimethoxysilane or phenyltrimethoxysilane. Examples of suitable comonomers for this are styrene, acrylonitrile and crosslinking or grafting monomers having more than one polymerizable double bond, for example diallyl phthalate, divinylbenzene, butanediol diacrylate or triallyl (iso)cyanurate. The hard constituents generally derive from styrene, α-methylstyrene and from copolymers of these, and preferred comonomers here are acrylonitrile, methacrylonitrile and methyl methacrylate.

Preferred core-shell graft rubbers comprise a soft core and a hard shell or a hard core, a first soft shell and at least one further hard shell. The incorporation of functional groups here, such as carbonyl, carboxylic acid, anhydride, amide, imide, carboxylic ester, amino, hydroxyl, epoxy, oxazoline, urethane, urea, lactam or halobenzyl groups, preferably takes place by adding suitably functionalized monomers during the polymerization of the final shell. Examples of suitable functionalized monomers are maleic acid, maleic anhydride, half-esters or diesters, or maleic acid, tert-butyl (meth)acrylate, acrylic acid, glycidyl (meth)acrylate and vinyloxazoline. The proportion of monomers with functional groups is generally from 0.1 to 25% by weight, preferably from 0.25 to 15% by weight, based on the total weight of the core-shell graft rubber. The weight ratio of soft to hard constituents is generally from 1:9 to 9:1, preferably from 3:7 to 8:2.

Rubbers of this type are known per se and are described, for example, in EP-A 208 187.

Thermoplastic polyester elastomers are another group of suitable impact modifiers. For the purposes of the invention, polyester elastomers are segmented copolyetheresters which comprise long-chain segments generally deriving from poly (alkylene) ether glycols and short-chain segments deriving from low-molecular-weight diols and dicarboxylic acids. Products of this type are known per se and are described in the literature, for example in U.S. Pat. No. 3,651,014. Corresponding products are also available commercially as Hytrel® (Du Pont), Arnitel® (Akzo) and Pelprene® (Toyobo Co. Ltd.).

It is also, of course, possible to use mixtures of various rubbers.

Component E

The molding compositions of the invention may comprise, as component E, additives, such as processing aids, pigments, stabilizers, flame retardants, or a mixture of various additives. Other examples of usual additives are oxidation retarders, agents to counteract decomposition by heat or decomposition by ultraviolet light, lubricants, mold-release agents, dyes, and plasticizers.

According to the invention, their proportion is from 0 to 40% by weight, preferably from 0 to 20% by weight, especially from 0 to 15% by weight, based on the total weight of components A to E. If component E is stabilizers, the proportion of these stabilizers, based on the total weight of A to E, is usually up to 2% by weight, preferably up to 1% by weight, in particular up to 0.5% by weight.

Based on the total of A to E, the amounts generally present of pigments and dyes are up to 6% by weight, preferably up to 5% by weight, and in particular up to 3% by weight.

The pigments for coloration of thermoplastics are well known: see for example R. Gächter and H. Müller, Taschenbuch der Kunststoffadditive, Carl Hanser Verlag, 1983, pp. 494–510. A first preferred group of pigments is that of white pigments, such as zinc oxide, zinc sulfide, white lead (2 $PbCO_3.Pb(OH)_2$), lithopones, antimony white and titanium dioxide. Of the two most common crystal forms of titanium dioxide (rutile and anatase) it is the rutile form in particular which is used for white coloration of the novel molding compositions.

Black pigments which may be used according to the invention are iron oxide black ($Fe_3O_4$), spinel black (Cu(Cr, Fe)$_2O_4$), manganese black (a mixture of manganese dioxide, silica and iron oxide), cobalt black and antimony black, and particularly preferably carbon black, usually used in the form of furnace black or gas black (see in this connection G. Benzing, Pigmente für Anstrichmittel, Expert-Verlag (1988), pp. 78 et seq.).

Inorganic color pigments, such as chromium oxide green, or organic color pigments, such as azo pigments and phthalocyanines, may, of course, be used according to the invention to achieve particular shades of color. Pigments of this type are widely available commercially.

Examples of oxidation inhibitors and heat stabilizers which according to the invention may be added to the thermoplastic compositions are halides of metals of Group I of the Periodic Table, e.g. those of sodium, of potassium or of lithium, for example chlorides, bromides, or iodides. It is also possible to use zinc fluoride and zinc chloride. Other compounds which may be used are sterically hindered phenols, hydroquinones, substituted representatives of this class, secondary aromatic amines, if desired combined with phosphorus-containing acids and/or salts of these, and mixtures of these compounds, preferably in concentrations of up to 1% by weight, based on the total weight of A to E.

A particularly preferred component E added to the molding compositions of the invention is copper(I) chloride, copper(I) bromide, or copper(I) iodide, or a mixture of these. It is preferable to use copper(I) iodide. The amount used here, based on the total weight of A to E, is generally up to 1.0% by weight, preferably up to 0.5% by weight.

Examples of UV stabilizers are various substituted resorcinols, salicylates, benzotriazoles and benzophenones, and the amounts of these used are generally up to 2% by weight.

Lubricants and mold-release agents, generally added in amounts of up to 1% by weight to the thermoplastic composition, are stearic acid, stearyl alcohol, alkyl stearates and stearamides, and also esters of pentaerythritol with long-chain fatty acids. It is also possible to use stearates of calcium, of zinc or of aluminum, and also dialkyl ketones, e.g. distearyl ketone.

Other possible additives are nucleating agents, such as talc.

The molding compositions of the invention may be prepared by processes known per se, for example by extrusion.

One way of preparing the molding compositions is to mix the starting components in customary mixing equipment, such as screw extruders, preferably twin-screw extruders, Brabender mixers or Banbury mixers, or else in kneaders, followed by extrusion. After extrusion, the extrudate is usually cooled and comminuted.

The sequence of mixing the components may be varied, and two or, if desired, three components may therefore be premixed, or else all of the components may be mixed together.

To obtain a very homogeneous molding composition, intensive and thorough mixing is advantageous. The average mixing times required for this are generally from 0.2 to 30 minutes, at from 280 to 370° C., preferably from 290 to 360° C.

The molding compositions of the invention in particular have good melt stability, in addition to good mechanical properties, such as high heat resistance and notched impact strength, good melt flowability, and good fire performance.

The molding compositions of the invention are suitable for producing moldings, films, fibers, or foams, examples of their uses being household articles, electrical or electronic components, and devices in medical technology. They are particularly suitable for producing moldings in the vehicle sector, particularly in the automotive sector, for example intake manifolds, water reservoirs, housings, ventilation pipes, fastening components, sleeves or cooling fan wheels.

EXAMPLES

Test Methods:

The viscosity number (VN [ml/g]) of the polyarylene ether sulfones was determined in a 1% strength by weight solution in N-methylpyrrolidone at 25° C.

The glass transition temperature $T_g$ and melting peak were determined using DSC measurements on specimens in the second heating cycle at a heating rate of 20 K/min.

The heat resistance of the specimens was determined via their Vicat softening point (Vicat B [° C.]). This was determined to DIN 53 460 with a force of 49.05 N and a temperature rise of 50 K/h, using standard small specimens.

Impact strength ($a_n$ [kJ/m$^2$]) was determined to ISO 179 1 eU.

Notched impact strength ($a_k$ [kJ/m$^2$]) was determined on ISO specimens to ISO 179 1 eA.

Flowability (MVI [ml/10']) was determined to DIN 53 735 at 320° C. with a load of 21.6 kg.

The measure used for melt stability was the viscosity profile in a capillary rheometer at 400° C. at shear rate 1000 Hz over a period of 30 minutes (first measurement after 5 minutes, second measurement after 35 minutes). The data given are in each case the quotient Q calculated from the viscosity η measured after 35 minutes and after 5 minutes: $Q=\eta_{35'}/\eta_{5'}$.

The fire performance of the specimens was determined to UL 94 on specimens of thickness 0.8 mm.

Preparation of molding compositions

Component A

The polyarylene ether sulfone A used had repeat units of the formula $I_1$: Ultrason® E 2010, commercial product from BASF AG. This product has a viscosity number of 54 ml/g, measured in 1% strength NMP solution at 25° C.

Component B

Component B1 was prepared as follows, by nucleophilic aromatic polycondensation:

287.08 g of dichlorodiphenyl sulfone, 238.91 g of dihydroxydiphenyl sulfone, and 9.18 g of 1,1,1-tris(4-hydroxyphenyl)ethane were dissolved in 1000 ml of N-methylpyrrolidone and treated with 143.76 g of anhydrous potassium carbonate. This mixture was kept at 195° C. for 4 h. After cooling to 120° C., methyl chloride was passed into the solution for a period of 1 h. The mixture was then diluted by adding 1000 ml of N-methylpyrrolidone, and the solid constituents were removed by filtration, and the polyarylene ether sulfone was isolated by precipitation in a mixture made from 10% by weight of N-methylpyrrolidone and 90% by weight of water. After careful washing with water, the polymer was dried for 12 h at 120° C. in vacuo. The viscosity number VN of the product B1 was 58 ml/g, and the glass transition temperature was 226° C.

Component B2 was prepared by nucleophilic aromatic polycondensation in a manner similar to that for component B1, but the reaction time for the monomers was only 3 h at 195° C. The viscosity number VN of the product B2 was 46 ml/g, and the glass transition temperature was 225° C.

Component B3 was prepared by nucleophilic aromatic polycondensation in a manner similar to that for component B1, but the reaction time of the monomers was only 2.5 h at 195° C. The viscosity number VN of the product B3 was 39 ml/g, and the glass transition temperature was 225° C.

Component B4 (for comparison) was prepared by nucleophilic aromatic polycondensation in a manner similar to that for component B1, but the starting materials used were 287.08 g of dichlorodiphenyl sulfone, 249.63 g of dihydroxydiphenyl sulfone, and 0.46 g of 1,1,1-tris(4-hydroxyphenyl)ethane. The viscosity number VN of the product B4 was 55 ml/g.

Component C

The filler C used comprised chopped glass fibers with polyurethane size, fiber diameter 10 μm.

The components were mixed in a twin-screw extruder at a melt temperature of from 320 to 350° C. The melt was passed through a water bath and pelletized.

The molding compositions were processed at 340° C. The mold temperature in each case was 100° C.

The makeup of the molding compositions and the results of the tests are listed in Table 1.

TABLE 1

| Molding composition | 1c | 1 | 2 | 2c | 3 | 4 | 5 | 6 | 7 | 8 | 3c |
|---|---|---|---|---|---|---|---|---|---|---|---|
| Makeup [% by weight]: | | | | | | | | | | | |
| A | 100 | 95 | 90 | 70 | 65 | 60 | 95 | 65 | 98 | 68 | — |
| B1 | — | 5 | 10 | — | 5 | 10 | — | — | — | — | — |
| B2 | — | — | — | — | — | — | 5 | 5 | — | — | — |
| B3 | — | — | — | — | — | — | — | — | 2 | 2 | — |
| B4 | — | — | — | — | — | — | — | — | — | — | 100 |
| C | — | — | — | 30 | 30 | 30 | — | 30 | — | 30 | — |
| Properties: | | | | | | | | | | | |
| Vicat B [° C.] | 223 | 224 | 224 | 225 | 225 | 225 | 224 | 224 | 224 | 225 | 224 |
| $a_n$ [kJ/m$^2$] | n.d. | n.d. | n.d. | 42 | 43 | 43 | n.d. | 42 | n.d. | 41 | n.d. |
| $a_k$ [kJ/m$^2$] | 7.2 | 7.3 | 7.1 | n.d. | n.d. | n.d. | 7.1 | n.d. | 7.2 | n.d. | 7.0 |
| MVI [ml/10'] | 46 | 42 | 40 | 21 | 20 | 20 | 51 | 25 | 55 | 29 | 45 |
| UL 94 classification | V-2 | V-0 | V-0 | V-0 | V-0 | V-0 | V-0 | V-0 | V-0 | V-0 | V-2 |
| Q | 1.36 | 1.06 | 1.04 | 6.3 | 4.3 | 3.0 | 1.07 | 4.2 | 1.09 | 3.1 | 1.31 | n.d.: not determined

Molding composition 1 of the invention and molding composition 3c as in U.S. Pat. No. 3,960,815 comprised the same total amount of 1,1,1-tris(4-hydroxyphenyl)ethane.

The molding compositions of the invention have not only good mechanical properties, such as high heat resistance or impact strength or, respectively, notched impact strength, but also good flowability in the melt and good fire performance, and especially have improved melt stability.

The invention claimed is:

1. A molding composition comprising
   A) from 39 to 99% by weight of at least one linear polyarylene ether sulfone built up from bifunctional monomer units,
   B) from 1 to 20% by weight of at least one polyarylene ether sulfone containing, based on the total weight of component (B), from 0.1 to 10% by weight of units which derive from 1,1,1-tris (4-hydroxyphenyl) ethane,
   C) from 0 to 60% by weight of at least one filler, D) from 0 to 40% by weight of at least one impact-modifying rubber, and E) from 0 to 40% by weight of one or more various additives, where the percentages by weight of components (A) to (E) give 100% in total.

2. A molding composition as claimed in claim 1, where the polyarylene ether sulfones (A) comprise from 0 to 100 mol % of repeat units

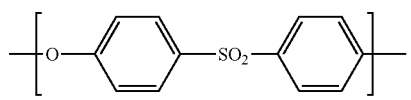
(I1)

and from 0 to 100 mol % of repeat units

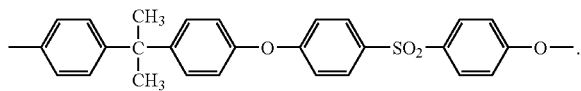
(I2)

3. A molding composition as claimed in claim 1, where the polyarylene ether sulfones (B) comprise i) repeat units of the formula (I1)

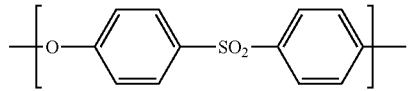
(I1)

and/or
ii) repeat units of the formula (I2)

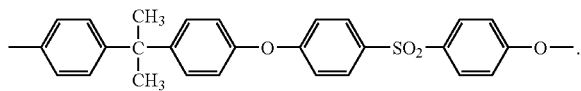
(I2)

and further comprise
iii) from 0.1 to 10% by weight, based on the total weight of the polyarylene ether sulfones (B) of units which derive from 1,1,1-tris(4-hydroxyphenyl)ethane.

4. A process for preparing molding compositions as claimed in claim 1, which comprises mixing components (A) to (E).

5. A molding, a film, a fiber, or a foam, obtainable from the molding compositions as claimed in claim 1.

6. A molding, a film, a fiber, or a foam as claimed in claim 5, which is a constituent of household items, of electronic components, of devices in medical technology, or of motor vehicle components.

7. A molding composition as claimed in claim 2, where the polyarylene ether sulfones (B) comprise repeat units of the formula (I1) and/or repeat units of the formula (I2), and further comprise from 0.1 to 10% by weight, based on the total weight of the polyarylene ether sulfones (B), of units which derive from 1,1,1-tris(4-hydroxyphenyl)ethane.

8. A molding, a film, a fiber, or a foam, obtainable from the molding compositions as claimed in claim 7.

9. A molding, a film, a fiber, or a foam as claimed in claim 8, which is a constituent of household items, of electronic components, of devices in medical technology, or of motor vehicle components.

10. A molding, a film, a fiber, or a foam, obtainable from the molding compositions as claimed in claim 2.

11. A molding, a film, a fiber, or a foam as claimed in claim 10, which is a constituent of household items, of electronic components, of devices in medical technology, or of motor vehicle components.

* * * * *